United States Patent [19]

Hubby, Jr.

[11] Patent Number: 5,035,490

[45] Date of Patent: Jul. 30, 1991

[54] FIBER OPTIC

[75] Inventor: Laurence M. Hubby, Jr., Palo Alto, Calif.

[73] Assignee: Hewlett-Packard Company, Palo Alto, Calif.

[21] Appl. No.: 462,679

[22] Filed: Jan. 9, 1990

[51] Int. Cl.⁵ .......................................... G02F 1/133
[52] U.S. Cl. .................................. 350/337; 350/334; 350/339 R; 350/96.27
[58] Field of Search ................. 350/334, 339 R, 337, 350/96.27

[56] References Cited

U.S. PATENT DOCUMENTS

| | | | |
|---|---|---|---|
| 4,183,630 | 1/1980 | Funada et al. | 350/334 |
| 4,241,984 | 12/1980 | Leibowitz | 350/337 |
| 4,344,668 | 8/1982 | Gunther et al. | 350/334 |
| 4,349,817 | 9/1982 | Hoffman et al. | 350/334 |
| 4,486,760 | 12/1984 | Funada et al. | 350/334 |
| 4,609,255 | 9/1986 | Leenhouts et al. | 350/337 |
| 4,674,840 | 6/1987 | Bennett | 350/337 |

FOREIGN PATENT DOCUMENTS

| | | | |
|---|---|---|---|
| 2847320 | 5/1973 | Fed. Rep. of Germany | 350/334 |
| 0110217 | 8/1980 | Japan | 350/334 |

Primary Examiner—Stanley D. Miller
Assistant Examiner—Anita Pellman Gross

[57] ABSTRACT

In accordance with the teachings of this invention, a novel liquid crystal display is taught which includes a layer of liquid crystal material, one or more polarizers, and a fiber optica faceplate. The fiber optic faceplate serves to allow ambient light from a much wider range of incident angles to illuminate the LCD than would be the case with prior art LCDs, and allows the viewer to position himself so as to avoid front surface glare and still see the display brightly illuminated, even in difficult lighting situations.

11 Claims, 5 Drawing Sheets

FIG. 7

FIBER OPTIC

INTRODUCTION

1. Technical Field

This invention relates generally to liquid crystal display (LCD) systems, and particularly to LCD systems augmented with a specialized fiber optic faceplate enhanced with means for polarizing ambient light passing through the faceplate toward and away from a surface of the LCD system.

2. Background

Typical prior art flat panel liquid crystal display systems are described in "Flat-Panel Displays Come on Strong in Speed, Resolution and Color", Computer Design, Feb. 1, 1989, pages 65 through 82. Operation and performance of direct multiplexed liquid crystal displays, including the twisted nematic (TN), the supertwisted birefringence effect (SBE), and the surface-stabilized ferroelectric liquid-crystal (SSFLC) display, are described by Scheffer "Direct-Multiplex Liquid-Crystal Displays", Seminar 4, Society for Information Display (SID) International Symposium Seminar Lecture Notes, Vol. 1, May 11, 1987, pages 4.1 through 4.34.

U.S. Pat. Nos. 2,400,877; 2,481,380, and 2,544,659, issued to J. F. Dreyer pertain to the use of an aligned organic dye as a polarizer.

It is known in the art to combine fiber optic faceplates with LCD systems. An example of such a combination relevant to this present invention is described in U.S. Pat. No. 4,349,817 to Hoffman et al. (Hoffman), which patent is hereby incorporated by reference into the present case. Major advantages of LCDs include their compact, rugged construction and their portability as display screens for portable personal computers.

Generally, LCDs which are intended for use in portable systems are of the reflection type in order to make use of available ambient light for illumination rather than incurring the weight, bulk, and power consumption characteristic of active backlighting. Such displays include a liquid crystal layer which is sandwiched between transparent front and back electrodes, and a specular or semi-specular (i.e., mirror-like) surface placed behind the display to enhance reflection. The system has an off-state, i.e., no voltage is applied between the front and back electrodes, and an on-state, i.e., such a voltage is applied.

The Hoffman patent pertains exclusively to LCDs of the dynamic scattering type. When this type of LCD is in the off-state the liquid crystal is clear, permitting light to pass through and be reflected back out by the reflective back electrode. In the on-state the liquid crystal scatters light increasingly in proportion to increasing applied voltage. This mode of controlling the light transmissivity of the liquid crystal material in response to the applied voltage is called the "dynamic scatter mode" (when light is transmitted through the LCD) and the "reflective dynamic scatter mode" (when light is reflected out the same side of the LCD).

A major problem with the reflective dynamic scatter mode LCD device used for direct viewing is that of contrast, defined here as the brightness ratio of the on-state to the off-state. The problem with this particular art, then, is how to reduce excessive levels of incident light emanating from unwanted light sources which are positioned outside the viewing angle of the LCD screen. Contrast desirably increases if these unwanted light sources can be neutralized.

To solve this contrast problem resulting from stray light, Hoffman coupled a specially designed fiber optic faceplate to a LCD system. To describe Hoffman's approach and the state of the prior art, applicants include FIG. 1 and FIG. 2, labelled as Prior Art in the present case. These figures plus the discussion below paraphrase the disclosures surrounding Hoffman's respective FIGS. 3 and 2.

Figure 1:
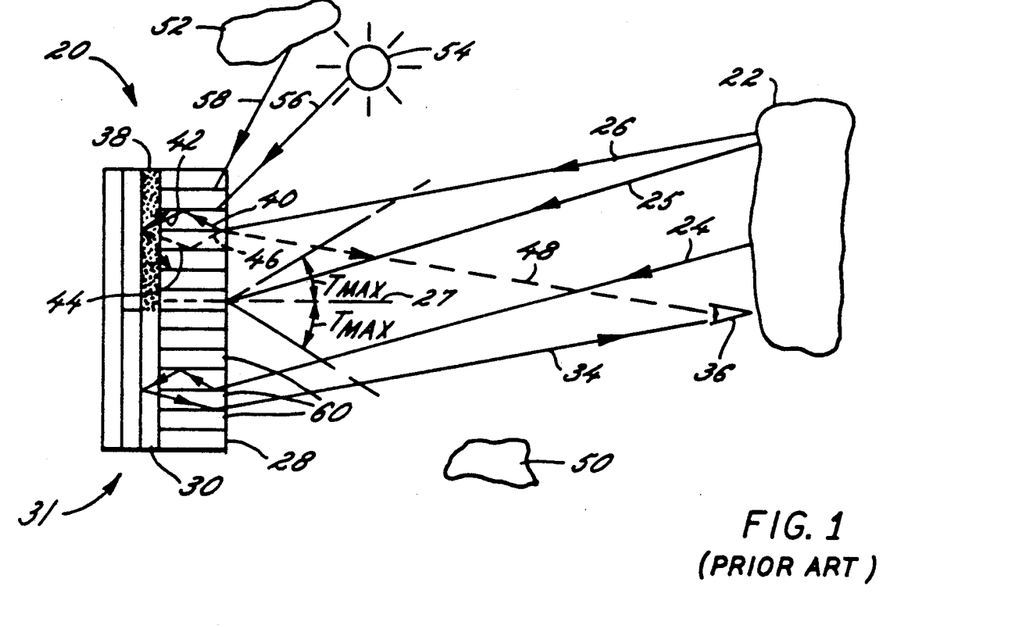
FIG. 1 depicts the operation of a prior art liquid crystal display, without polarizers, but using a fiber optic faceplate.

FIG. 1 (Prior Art) shows a direct view liquid crystal image display system 20 viewed directly under ambient light from a source of light 22 such as a bright sky or brightly lit room (not shown). Light rays 24, 25, and 26 from light source 22 hit a fiber optic faceplate 28 within an acceptance cone Theta$_{max}$ [herein, T(max)] of faceplate 28. Rays 24, 25, 26 are transmitted to a liquid crystal layer 30 of a liquid crystal display device 31 over which faceplate 28 lies.

The definition and significance of the acceptance angle T(max) appears in the discussion about Equation (1) below. T(max) is measured with respect to an axis 27 which is parallel to the horizontal light-propagating axis (not labelled) of the optical fibers comprising fiber optic faceplate 28 and perpendicular to the face of faceplate 28.

First considering the off-state condition, ray 24 hitting a localized liquid crystal area 32 when in the off-state is specularly reflected along a ray path 34 to the eye 36 of an observer (not shown) who as a result sees a bright display region.

Conversely, now considering the on-state condition, previously mentioned light ray 26 hits a localized liquid crystal area 38 which is in the on-state, with the result that ray 26 is scattered so that only a portion of ray 26 is reflected. That is, the reflected portion of the scattered light follows a path 40, 42, 44, 46, and 48 back to observer eye 36, which thus sees a relatively dark display region 38 (i.e., on-state region 38).

To address stray light coming from other light sources such as those positioned as are light sources 50, 52, and 54 (our Sun), existing technology configures system 20 so that light enters and leaves faceplate 28 only within a well defined faceplate 28 acceptance angle T(max). By this approach, stray light is absorbed by faceplate 28.

That is, by absorbing light from sources outside the acceptance cone T(max) of faceplate 28, such as a ray 56 from the Sun 54 and a ray 58 from light source 52, faceplate 28 prevents undesirable loss of image contrast of the LCD images with respect to ambient light generated by such light sources as 22, 50, 52, and 54.

Figure 2:
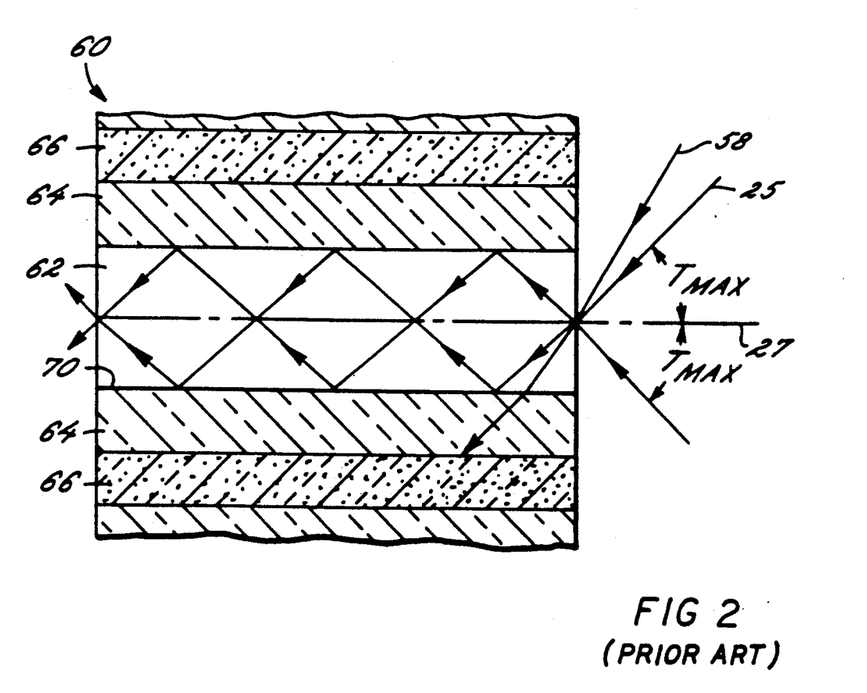
FIG. 2 depicts the operation of a fiber contained within a fiber optic faceplate of FIG. 1.

FIG. 2 (Prior Art) illustrates in cross-section a single optical fiber 60 of the type bundled together to make up faceplate 28 shown in FIG. 1. Faceplate 28 is formed with many parallel optical fibers 60 which are fused together. Each fiber 60 has a light-transparent core 62 having an index of refraction $n_1$, covered with a light-transparent sheath 64 having an index of refraction $n_2$ which is less than $n_1$, which in turn is covered with an optically absorbing material 66.

Faceplate 28 has an acceptance cone of angle T(max), an angle related to the index of refraction $=n_1$ of core 62 with respect to the index of refraction $=n_2$ of sheath 64. These attributes are related according to the well-known relationship expressed in Equation (1) below:

$$\sin T_{max} = [(n_1)^2 - (n_2)^2]^{1/2} = N.A., \quad (1)$$

where

N.A. = the Numerical Aperature of the optical fiber.

An incident light ray 25 falling within the acceptance angle T(max) to optical fiber axis 27 propagates through core 62 by the well known phenomenon of multiple total internal reflections from a boundary 70 existing between core 62 and sheath 64. Conversely, an incident light ray 58 falling outside incidence angle T(max) will not be totally reflected, but instead will propagate through boundary 70 into transparent sheath 64, finally to be absorbed by light absorbing layer or material 66.

More simply stated, the function of the fiber plate in the Hoffman LCD is to absorb all light which strikes the display outside the viewing angle of the display (defined as the angle over which the display provides an image of acceptable contrast), thereby reducing stray light and enhancing the contrast of the display. Even with this enhancement, however, the dynamic scattering type of LCD has not become a commercially important device due to its relatively limited viewing angle and poor contrast.

Twisted nematic (TN) and super twisted nematic (STN) LCDs, on the other hand, have become commercially important in the last 10 or so years largely because they offer improved contrast and viewing angle compared to previous types, such as the dynamic scattering LCD with or without the Hoffman improvements.

Limited contrast and viewing angle, however, remain among the most serious shortcomings of TN and STN LCDs, improved in these areas though they may be. The LCD industry, in fact, continues to seek displays capable of delivering the general appearance of printed characters on paper.

Application of the teachings of Hoffman will not improve, and in fact will seriously degrade, the contrast of a TN or STN LCD. This is for two reasons:

First, eliminating light which strikes the display at angles to the display surface normal greater than the viewing angle of the display will not enhance the contrast because TN and STN displays depend upon the action of polarizers on polarized light propagating within the display rather than scattering to produce the light and dark areas of their images.

Second, introduction of a fiber plate, as taught by Hoffman, in near-contact with the liquid crystal layer itself will seriously reduce the image contrast because light passing through such a fiber plate is strongly depolarized, thus largely destroying the distinction between the light and dark areas of the image.

Additionally, it is neither necessary nor desirable to incorporate a means, such as the Hoffman style fiber plate, which absorbs all light outside of the nominal viewing angle of the display into a TN or STN LCD.

The black interstitial material in the Hoffman fiber plate causes a sharp transition from a normal display appearance to a completely black display appearance with increasing angle which can be annoying to the viewer of a TN or STN type LCD. This is because the contrast of TN and STN LCDs degrades slowly with angle, and, although viewing contrast may not be fully acceptable at high angles, a viewer may be able to determine the general nature of what is being displayed or merely that something is being displayed, even when he views the display at high angles.

Since this information is frequently important or desirable to the viewer, the Hoffman style fiber plate does not constitute an improvement to many modern types of LCDs.

Hoffman teaches the application of a fiber plate composed of fibers each having as low numerical aperture as possible and restricting the viewing angle by means of the black interstitial material as much as possible in order to reject as much stray light as possible. In contrast, the present invention teaches the application of fiber plates having as high a numerical aperture as possible and permitting as wide a viewing angle as possible in order to gather as much ambient light as possible to illuminate the display.

Figure 3:
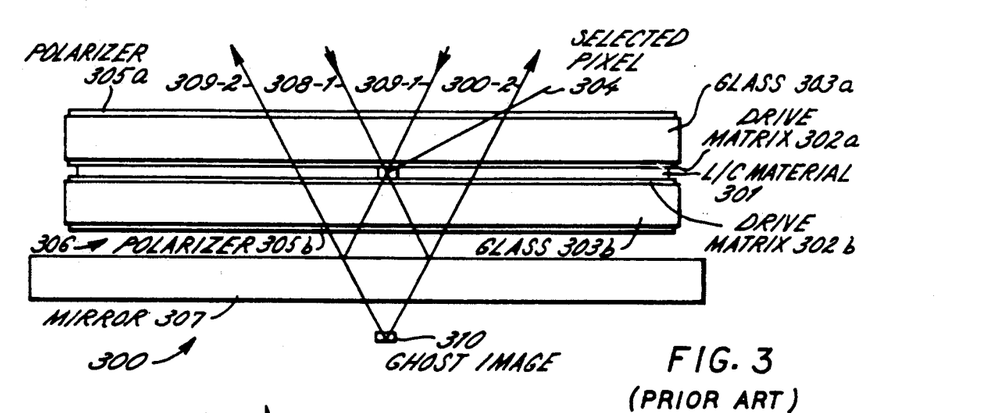
FIG. 3 depicts a prior art liquid crystal display utilizing polarizers, and the ghost image formed therewith.

FIG. 3 shows a typical prior art reflective liquid crystal display utilizing polarizers. LCD 300 includes a layer of liquid crystal material 301 sandwiched between drive matrices 302a and 302b for applying electric fields to appropriate locations within the layer of liquid crystal material 301. For example, selected pixel 304 (shown as dark, but may actually appear dark or light depending upon polarizer orientation) is shown within the layer of liquid crystal material 301, caused by an appropriate electric field in that location applied across that portion of liquid crystal material 301 by matrices 302a and 302b.

Glass plates 303a and 303b serve to support drive matrices 302a and 302b. On the other sides of glass plates 303a and 303b are formed polarizers 305a and 305b, respectively. Polarizer 305a serves as the exposed surface of liquid crystal display 300, and polarizer 305b faces semi-diffused mirror 307, separated from polarizer 305b by gap 306 which may be conveniently filled up by a glass plate. If desired, mirror 307 is formed as an aluminized coating on the surface of polarizer 305b which is not in contact with glass plate 303b.

One of the disadvantages of the prior art liquid crystal display 300 of FIG. 3 is that, since glass plate 303b is generally rather thick compared with the pixel-to-pixel spacing, and since mirror 307 is specular or semi-specular in nature, a ghost image or "shadow" 310 is formed below the actual pixel 304. A simple construction of the paths of two light rays according to well-known principles of geometrical optics suffices to show that this is true. Consider ray 308-1 which enters the display from above on the left, traverses the display cell, is reflected by mirror 307, and reemerges from the display as ray 308-2. Consider also ray 309-1 which enters from above on the right and reemerges in a similar manner as ray 309-2. Extensions of rays 308-2 and 309-2 cross at 310, and hence appear to an observer to have come from 310. Also, since both rays pass through the location of the selected pixel 304, the intensity of both rays is modulated by the action of the display to be the same as that of the selected pixel 304. Ghost image 310 is thus a virtual image in the geometrical optics sense of the selected pixel 304 lying behind 304 and, depending upon the observer's viewing position, may appear laterally displaced from 304 as well due to viewing parallax.

An additional disadvantage of prior art liquid crystal displays such as 300 in FIG. 3 is that the apparent illumination of the display is a strong function of viewing angle, and that the display appears most strongly illuminated by ambient light when viewed at an angle close to that at which light also specularly reflects from the top display surface (the top surface of polarizer 305a in FIG. 3). The viewer is thus frequently tempted to view the display in a manner which causes him to have to contend with annoying glare.

SUMMARY OF THE INVENTION

In accordance with the teachings of this invention, a novel liquid crystal display is taught which includes a layer of liquid crystal material, one or more polarizers, and a fiber optic faceplate. The fiber optic faceplate serves to allow ambient light from a much wider range of incident angles to illuminate the LCD than would be the case with prior art LCDs, and allows the viewer to position himself so as to avoid front surface glare and still see the display brightly illuminated, even in difficult lighting situations.

The example figures presented illustrate but one of the many possible constructions that can made according to invention defined by the claims. These figures correspond to the example discussed below in the Detailed Description.

DETAILED DESCRIPTION OF THE INVENTION

Figure 4A:
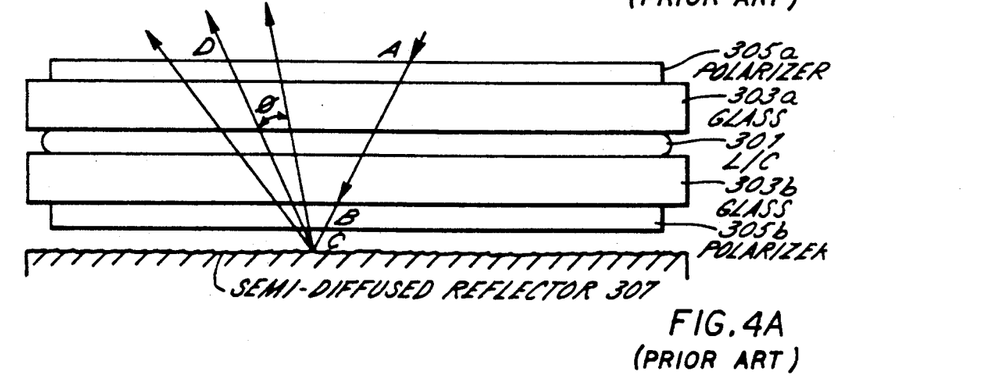
FIGS. 4a through 4c depict the liquid crystal display of FIG. 3, and the angle over which incident light may serve to illuminate the LCD.

The fiber faceplate LCD of this invention appears more brightly illuminated than a conventional reflective LCD under a wide range of ambient lighting conditions due to the superior light diffusion characteristics of the fiber faceplate. To understand why this is the case, consider a prior art reflective LCD shown in FIG. 4a (in which the drive electrode and alignment layers, well known in the art, are omitted for clarity).

Figure 4B:
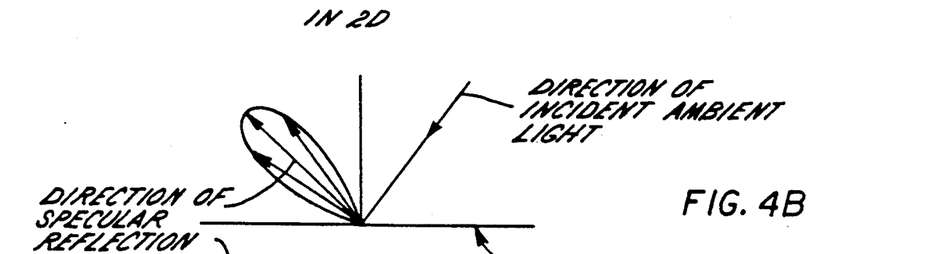
Figure 4C:
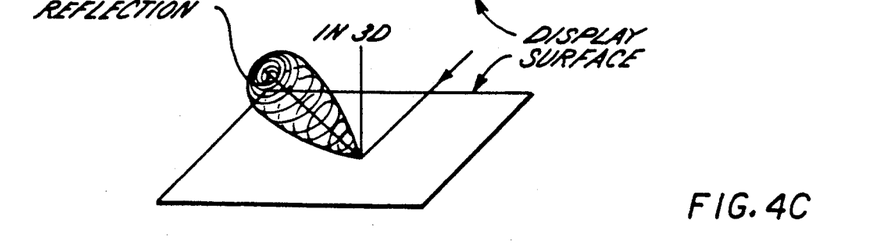

The apparent background illumination is reflected ambient light. Consider a ray of ambient light entering the conventional display at A. After passing through the display cell, the ray emerges at B and is then reflected by a semi-diffuse mirror at C. After reflection the light present in the original ray is spread over a cone with half-angle $\phi$ due to the diffusing action of mirror 307. This is shown in the two-dimensional polar plot of reflectivity of FIG. 4b, and the three-dimensional polar plot of reflectivity of FIG. 4c. The axis of this cone is coincident with the ray C-D which emerges from the display at the same angle as would the incident ray A-C, were the reflection purely specular in nature. That is, the cone describing the intensity of the reflected illumination as a function of angle is an article of revolution about the direction of specular reflection This means that only light sources within the angle of reflecting off of the top surface of polarizer 305a, which is parallel to mirror 307, and directly back in a viewer's eyes will contribute significantly to the apparent background illumination. Thus, unless the angle $\phi$ is large, only a relative few of the typical multiplicity of ambient light sources can contribute illumination. Due to the nature of the diffuse scattering process, however, light scattered at large angles tends to be depolarized. The light exiting the cell at B has been polarized by the action of the LC cell. If it is depolarized upon reflection at C by a strongly diffusing reflector (which would be necessary in order to produce a large angle $\phi$), up to half of it will be absorbed by the LC cell polarizers 305a, 305b, thus decreasing the display's apparent brightness. A large amount of diffusion and overall display brightness thus trade off against each other, and this tends to restrict real displays to small values of $\phi$. As a consequence, the apparent illumination of conventional reflective LCDs is a strong function of angle and light sources which contribute to that illumination must be located near a position that would cause any specular reflection (perhaps off of the front of the display) to fall in the viewer's eyes. This restriction, coupled with the fact that the viewing angle over which the LC cell itself presents an image of reasonable contrast may also be quite restricted, can have a disastrous effect on image quality.

Figure 5A:
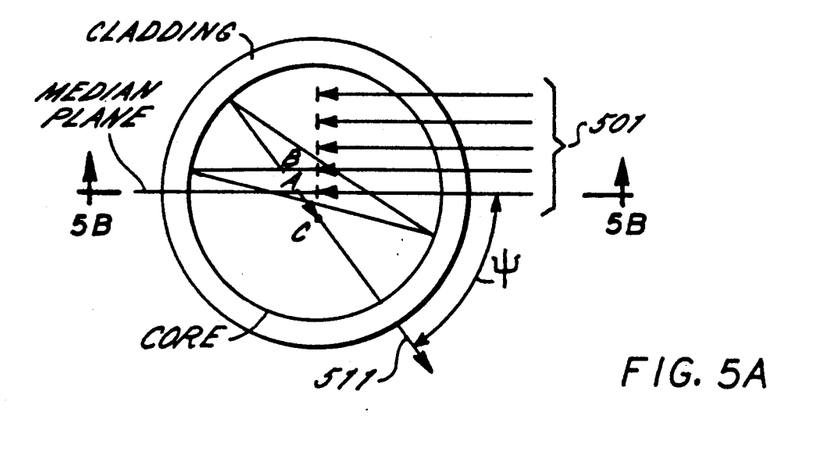
FIGS. 5a through 5c depict the operation of a single fiber used in the fiber faceplate of the present invention.
Figure 5B:
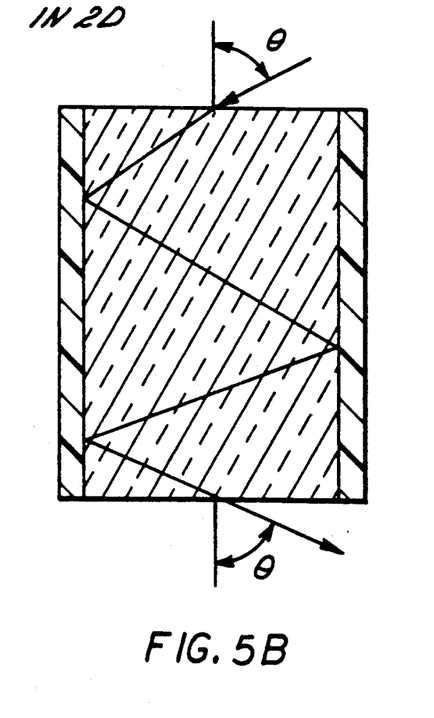
Figure 5C:
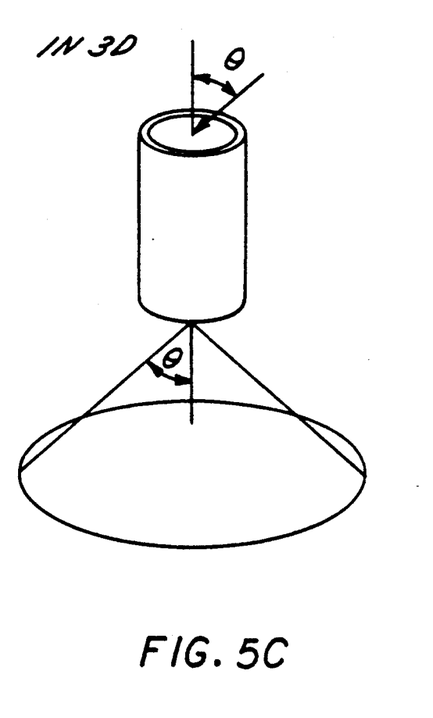

In order to understand the analogous action of the present invention utilizing a fiber faceplate LCD, consider first the action of a single fiber on incoming light as shown in FIGS. 5a–5c of the accompanying figures. In the top view of a fiber (FIG. 5a), one can see that only that portion of the light 501 entering the top which lies in a median plane (i.e., a plane which includes the axis of the fiber; the ray entering at A lies in such a plane) will remain in that plane as it rattles down through the fiber and exits at the bottom. Other portions of the light, such as the ray incident at B, will be deviated in the azimuthal direction at each reflection and will, upon exiting as light beam 511 at C, have accumulated some net azimuthal deviation relative to the original direction of the incident, $\Psi$. All of the rays, incident at the same angle, theta, with respect to the axis of the fiber, will also exit at the angle $\theta$ with respect to the axis of the fiber.

There will be rays, however, among the multiplicity of rays which describe the light filling the fiber which exit at every possible azimuth $\Psi$. Light incident from a single direction is thus converted into a hollow cone of light whose apex angle equals the incident angle, $\Theta$. FIG. 5b depicts a side view of the optical fiber of FIG. 5a, and FIG. 5c depicts in three dimensions the operation of the optical fiber of FIGS. 5a and 5b, showing that light incident from one direction is converted into a hollow cone of light having an apex angle equal to the incident angle.

Figure 6A:
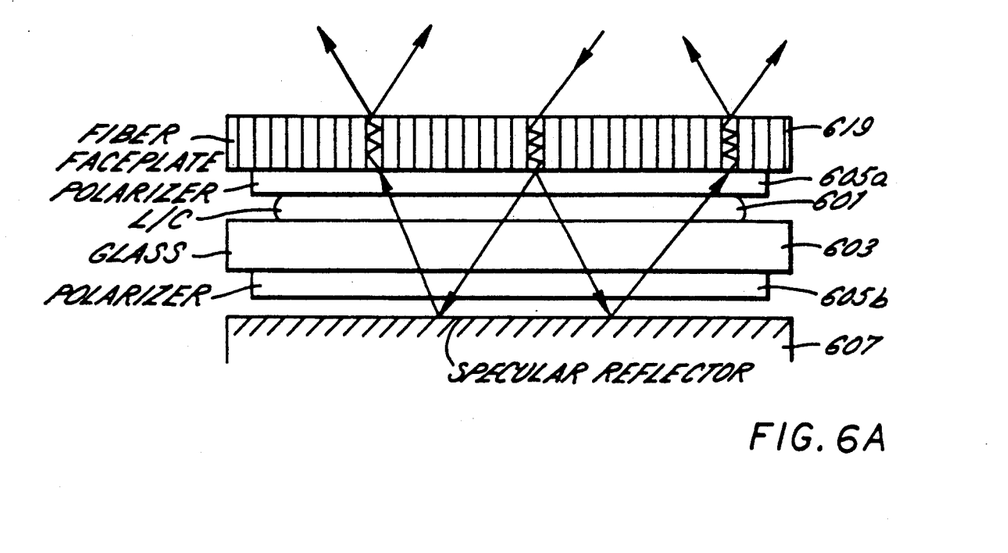
FIGS. 6a through 6c depict the operation of one embodiment of an LCD display constructed in accordance with the teachings of this invention, and the range of angles over which ambient light serves to illuminate the LCD.

Consider now the embodiment of a fiber faceplate LCD of this invention shown diagrammatically in FIG. 6a (again, with the drive electrode and alignment layers omitted for clarity). Incident illumination from a single direction will be spread into a hollow cone by the action of the individual fibers of fiber faceplate 619, as just described. Upon passage through the LC cell it encounters specular reflector 307 which sends it back through the cell without depolarization and the attendant loss in intensity. The second passage through the fiber faceplate 619 results in a second azimuthal diffusion and the same hollow conical far field pattern described above.

Figure 6B:
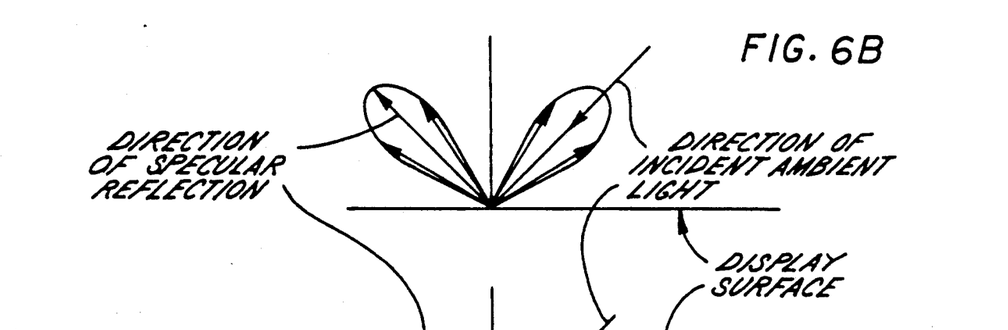
Figure 6C:
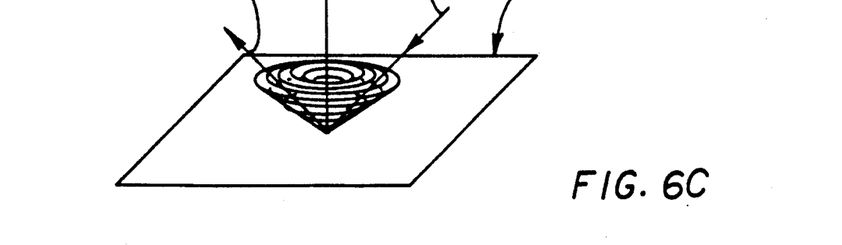

There are two key differences between this situation and that of the conventional reflective LCD, shown in two dimensions in FIG. 6b and in three dimensions in FIG. 6c. First, since the diffusions take place entirely before and entirely after the double passage of the light through the LC cell and its polarizers 605a, 605b, there is no loss in light due to depolarization. Second, the volume representing the intensity of light scattered at a given angle is now an article of revolution about the normal to the display surface, not about the direction of specular reflection.

This means (a) that light from a given ambient source is spread over a much larger far field angle than in the case of the conventional display, (b) that ambient light from a larger variety of directions can contribute to the illumination apparent to a given viewer than in the case of the conventional display, and (c) that the viewer need not be close to a position which would cause specularly reflected light to fall in his eyes in order to see the display brightly illuminated.

Figure 7:
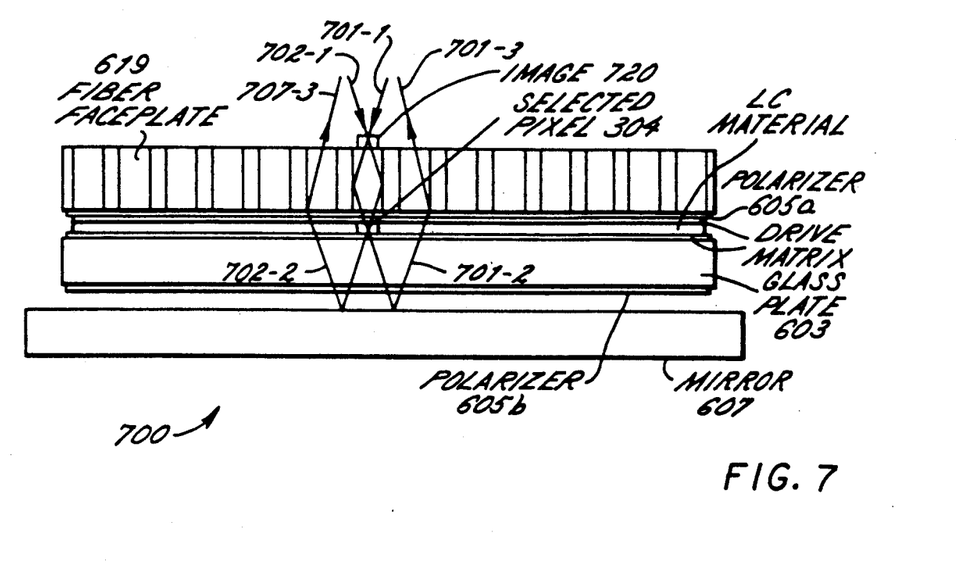
FIG. 7 depicts one embodiment of an LCD constructed in accordance with the teachings of this invention and the elimination of the ghost image obtained therewith.

FIG. 7 depicts one embodiment of a fiber faceplate LCD constructed in accordance with the teachings of this invention, and how it substantially eliminates the ghost image.

Consider a geometrical construction with two entering rays, 701-1 and 702-1, similar to that depicted in FIG. 3. In order to pass through the region of selected pixel 304, rays 701-1 and 702-1 must enter the fiber plate directly above 304, due to the well-known light-conducting property of the individual fibers. Upon passing through the display cell and reflecting off of mirror 607, reflected rays 701-2 and 702-2 encounter the fiber plate a second time.

Because the thickness of the lower half of the display is typically large compared with the fiber to fiber spacing in the fiber faceplate, rays 701-2 and 702-2 encounter entirely different fibers than did 701-1 and 702-1 initially, and ray 701-2 encounters an entirely different fiber than does ray 702-2. Also rays 701-2 and 702-2 strike the fibers through which they pass out of the display at random locations within the fibers' cores, depending upon the incident angles and azimuths (parameters $\Theta$ and $\Psi$ in FIGS. 5a-c) of rays 701-1 and 702-1. Exiting rays 701-3 and 702-3 are thus randomized in their exiting azimuths, as explained previously in the descriptions of FIGS. 5a-c, and do not in general appear to have come from a single region of space, i.e., a ghost image.

The light which ordinarily would be concentrated in a ghost image is smeared out by the diffusing effect of a second passage through the fiber faceplate and now forms a much larger and more diffuse shadow surrounding the selected pixel than in the case of the conventional LCD of FIG. 3. This larger and more diffuse shadow is less visible to the viewer than the ghost image of FIG. 3 in two ways. First, the shadow is largely intermixed with light which passed through nearby regions of the display, and hence its maximum lightness or darkness, depending upon the optical state of selected pixel 304, is not very different from that of the surrounding areas of the display. Second, the shadow is substantially spatially diffused, like an out-of-focus image, and hence is not easily and clearly seen by the viewer as containing any information.

The only way in which the viewer can observe the selected pixel clearly is by means of the image 720, which exists at the top surface of the fiber faceplate due to the well-known light-piping properties of the individual fibers in the faceplate. In order for this image to be spatially sharp, the thickness of polarizer 605a must be small compared with the size of a display pixel.

In one embodiment of this invention, polarizer 605a is formed of a thin layer (typically within the range of approximately 0.5 to 100 micron) in order to present a sharp viewable image 720 when used with typical display pixel spacings of 100 to 400 microns. Thin polarizer 605a can be fabricated using an aligned organic dye, such as is described in the aforementioned Dryer patents. In one specific embodiment, polarizer 605a is fabricated using the 105MS polarizer coating available from Da-Lite Screen Corporation of Cincinnati, Ohio. In some cases, an overcoating layer between the polarizer coating and the other functional layers of the liquid crystal cell may be required, such as Da-Lite Corp's special polymer overcoating or a thin film overcoating of a compatible material such as silicon dioxide.

In an embodiment of this invention where polarizer 605b is used, polarizer 605b is formed in a similar manner as is polarizer 605a. Fiber faceplate 619 can be fabricated ta a thickness in the range of approximately 0.7 to 1.1 millimeters, having individual fibers in the range of 6 to 25 microns. In one embodiment, fiber faceplate 619 is made approximately of 0.66 na clear fused glass optical fiberplate available from Incom, Inc. of Southbridge, Mass.

Thus, in accordance with the teachings of this invention, a novel LCD structure is taught including a fiber faceplate (a) which does not degrade the viewing angle, contrast, and other operating features of the liquid crystal element itself, (b) which provides a wider angle over which ambient light is received for the purposes of illumination, and (c) which provides that the viewer need not be close to a position that would cause specularly reflected ambient light to fall in the viewer's eyes.

The teachings of this invention are useful not only for liquid crystal displays including polarizers on both sides of the liquid crystal, but also those liquid crystal displays which include at least one polarizer, such as those liquid crystal displays which include a polarizer only on the viewer side of the liquid crystal. The teachings of this invention are also applicable to those liquid crystal displays which, in addition to one or more polarizers, also include one or more birefringent elements serving to convert light between elliptical polarization and linear polarization.

All publications and patent applications cited in this specification are herein incorporated by reference as if each individual publication or patent application were specifically and individually indicated to be incorporated by reference.

The preceding Detailed Description and Drawings provide several specific examples of the best modes for practicing the claimed invention. However, it is the following claims that actually (a) define the invention and (b) establish the scope of the invention.

The invention claimed is:

1. A visual image display apparatus comprising:
   a liquid crystal layer having a front and back surface;
   a front orientation layer formed adjacent to said front surface of said liquid crystal layer;
   a back orientation layer formed adjacent to said back surface of said liquid crystal layer;
   a front transparent electrode formed adjacent to said front orientation layer;
   a rear transparent electrode formed adjacent to said rear orientation layer;

a reflector serving to reflect light received from the rear of said liquid crystal layer back through said liquid crystal layer;

an optical fiber faceplate formed in front of said front transparent electrode; and a front polarizer formed separate from and between said front transparent electrode and said optical fiber faceplate.

2. A visual image display apparatus as in claim 1 which further comprises:

a rear polarizer located between said reflector and said rear orientation layer.

3. A direct view image display apparatus, comprising:
a) a reflective liquid crystal display (LCD) device;
   i) formed for operating in a nondynamic scattering mode; and
   ii) having an LCD surface;
b) a fiber optic faceplate;
   i) having an upper face and a lower face;
   ii) positioned with the lower face facing the LCD surface;
   iii) having a multiplicity of straight and rigid optical fibers whose longitudinal axes are parallel to each other and substantially perpendicular to:
      1) the upper face and the lower face of the faceplate; and
      2) the LCD surface;
   iv) each of the fibers being formed to cooperate with the reflective LCD surface to collect and project through the faceplate any of a plurality of light rays emitted by an ambient light source if any, thereby enhancing the visibility of the image displaced on the upper face of the faceplate; and
c) a polarizer;
   i) positioned between the LCD surface and the faceplate;
   ii) formed for polarizing the light passing between the LCD surface and the faceplate; and
   iii) having a thickness less than approximately 100 microns.

4. A direct view image display apparatus, comprising:
a) a reflective liquid crystal display (LCD) device;
   i) formed for operating in a nondynamic scattering mode; and
   ii) having an LCD surface;
b) a fiber optic faceplate;
   i) having an upper face and a lower face;
   ii) positioned with the lower face facing the LCD surface;
   iii) having a multiplicity of straight and rigid optical fibers whose longitudinal axes are parallel to each other and substantially perpendicular to:
      1) the upper face and the lower face to the faceplate; and
      2) the LOC surface;
   iv) each of the fibers being formed to cooperate with the reflective LCD surface to collect and project through the faceplate any of a plurality of light rays emitted by an ambient light source if any, thereby enhancing the visibility of the image displaced on the upper face of the faceplate; and
   v) formed to a thickness within the range of approximately 0.7 to 1.1 millimeters; and
c) a polarizer;
   i) positioned between the LCD surface and the faceplate;
   ii) formed for polarizing the light passing between the LCD surface and the faceplate.

5. A direct view image display apparatus, comprising:
a. a reflective liquid crystal display (LCD) device,
   i. formed for operating in a nondynamic scattering mode,
   ii. having an LCD surface;
b. a fiber optic faceplate;
   i. having an upper face and a lower face,
   ii. positioned with the lower face facing the LCD surface,
   iii. having a multiplicity of straight and rigid optical fibers whose longitudinal axes are parallel to each other and substantially perpendicular to
      (1) the upper face and the lower face of the faceplate, and
      (2) the LCD surface,
   iv. each of the fibers being formed to cooperate with the reflective LCD surface to collect and project through the faceplate any of a plurality of light rays emitted by an ambient light source if any, thereby enhancing the visibility of the image displaced on the upper face of the faceplate; and
   v. the optical fibers having a numerical aperture of approximately 0.66 or more; and
c. a polarizer;
   i. positioned between the LCD surface and the faceplate,
   ii. formed for polarizing the light passing between the LCD surface and the faceplate.

6. A direct view image display apparatus, comprising:
a. a reflective liquid crystal display (LCD) device,
   i. formed for operating in a non-dynamic scattering mode,
   ii. having an LCD surface;
b. a fiber optic faceplate;
   i. having an upper face and a lower face,
   ii. positioned with the lower face facing the LCD surface,
   iii. having a multiplicity of straight and rigid optical fibers whose longitudinal axes are parallel to each other and substantially perpendicular to
      (1) the upper face and the lower face of the faceplate, and
      (2) the LCD surface,
   iv. each of the fibers being formed to cooperate with the reflective LCD surface to collect and project through the faceplate any of a plurality of light rays emitted by an ambient light source if any, thereby enhancing the visibility of the image displaced on the upper face of the faceplate; and
c. a polarizer;
   i. positioned between the LCD surface and the faceplate; and
   ii. formed for polarizing the light passing between the LCD surface and the faceplate; and
d. a sheath;
   a) formed to enclose each of the fibers along its longitudinal axis;
   b) formed to azimuthally diffuse within the faceplate the ambient light if any incident on the faceplate thereby enhancing the visibility of the image displayed on the upper face of the faceplate.

7. A display apparatus for displaying a plurality of character images on a generally planar screen that is transparent to light, the character images being formed to be viewed by a viewer who looks at the characters from the front side of the screen, the apparatus comprising:
  a) a fiber optic faceplate;
    i) formed with an outer face and an inner face, the outer face serving to be viewed by the viewer to see the character images displayed on the inner face;
    ii) formed from a plurality of fiber optic cables, each individually enclosed in a light reflecting sheath, positioned in close proximity to one another, aligned substantially parallel to one another;
    iii) formed to a thickness within the range of approximately 0.7 to 1.1 millimeters;
  b) a first means, formed for optically treating the light passing through the faceplate;
  c) a second means, formed for generating and removing a plurality of characters that are viewed through the faceplate; and
  d) a third means, formed for reflecting the light passing through the faceplate.

8. A display apparatus for displaying a plurality of character images on a generally planar screen that is transparent to light, the character images being formed to be viewed by a viewer who looks at the characters from the front side of the screen, the apparatus comprising:
  a) a fiber optic faceplate;
    i) formed with an outer face and an inner face, the outer face serving to be viewed by the viewer to see the character images displayed on the inner face;
    ii) formed from a plurality of fiber optic cables having a numerical aperture of approximately 0.66 or more, each individually enclosed in a light reflecting sheath, positioned in close proximity to one another, aligned substantially parallel to one another,
  b) a first means, formed for optically treating the light passing through the faceplate;
  c) a second means, formed for generating and removing a plurality of characters that are viewed through the faceplate; and
  d) a third means, formed for reflecting the light passing through the faceplate.

9. A screen apparatus formed for displaying characters produced by a liquid crystal (LCD) system capable of operating in the presence of an external light source, the apparatus comprising:
  a) a faceplate;
    i) transparent to light;
    ii) having an outer surface and an inner surface, the two surfaces being aligned to be generally coplanar;
    iii) formed by bundling an array of light tubes to be simultaneously parallel to one another but perpendicular to both the outer surface and the inner surface; and
    iv) formed to transmit light from the external light source to illuminate the characters;
  b) a first means;
    i) formed for polarizing the light passing through the faceplate;
    ii) positioned behind the substantially coplanar with the inner surface of the faceplate; and
    iii) having a thickness less than approximately 100 microns;
  c) a second means;
    i) formed for generating the characters with a liquid crystal display (LCD); and
    ii) positioned behind and substantially coplanar with the inner surface of the faceplate; and
  d) a third means;
    i) formed for reflecting the light that passes through the faceplate; and
    ii) positioned behind and substantially coplanar with the inner surface of the faceplate, the first means and the second means.

10. A screen apparatus formed for displaying characters produced by a liquid crystal (LCD) system capable of operating in the presence of an external light source, the apparatus comprising:
  a) a faceplate;
    i) transparent to light;
    ii) having an outer surface and an inner surface, the two surfaces being aligned to be generally coplanar;
    iii) formed by bundling an array of light tubes to be simultaneously parallel to one another but perpendicular to both the outer surface and the inner surface;
    iv) formed to transmit light from the external light source to illuminate the characters; and
    v) formed to a thickness within the range of approximately 0.7 to 1.1 millimeters;
  b) a first means;
    i) formed for polarizing the light passing through the faceplate; and
    ii) positioned behind the substantially coplanar with the inner surface of the faceplate;
  c) a second means;
    i) formed for generating the characters with a liquid crystal display (LCD); and
    ii) positioned behind and substantially coplanar with the inner surface of the faceplate; and
  d) a third means;
    i) formed for reflecting the light that passes through the faceplate; and
    ii) positioned behind and substantially coplanar with the inner surface of the faceplate, the first means and the second means.

11. A screen apparatus formed for displaying characters produced by a liquid crystal (LCD) system capable of operating in the presence of an external light source, the apparatus comprising:
  a) a faceplate;
    i) transparent to light;
    ii) having an outer surface and an inner surface, the two surfaces being aligned to be generally coplanar;
    iii) formed by bundling an array of light tubes having a numerical aperature of approximately 0.66 or more to be simultaneously parallel to one another but perpendicular to both the outer surface and the inner surface; and
    iv) formed to transmit light from the external light source to illuminate the characters;
  b) a first means;
    i) formed for polarizing the light passing through the faceplate; and
    ii) positioned behind and substantially coplanar with the inner surface of the faceplate;
  c) a second means;

i) formed for generating the characters with a liquid crystal display (LCD); and ii) positioned behind and substantially coplanar with the inner surface of the faceplate; and d) a third means;

i) formed for reflecting the light that passes through the faceplate; and ii) positioned behind and substantially coplanar with the inner surface of the faceplate, the first means and the second means.

* * * * *